(12) United States Patent
Barr

(10) Patent No.: US 8,573,632 B1
(45) Date of Patent: Nov. 5, 2013

(54) GRAIN-COORDINATED AIRBAG TEAR SEAM

(71) Applicant: Faurecia Interior Systems, Inc., Auburn Hills, MI (US)

(72) Inventor: Mathew Barr, Clarkston, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/728,041

(22) Filed: Dec. 27, 2012

(51) Int. Cl.
*B60R 21/20* (2011.01)

(52) U.S. Cl.
USPC ...................................................... 280/728.3

(58) Field of Classification Search
USPC .................................. 280/728.2, 728.3, 732
See application file for complete search history.

(56) References Cited

U.S. PATENT DOCUMENTS

| 5,639,115 A * | 6/1997 | Kelley et al. ............... 280/728.3 |
| 8,403,357 B2 * | 3/2013 | Choi .......................... 280/728.2 |
| 2012/0139213 A1 * | 6/2012 | Iseman ....................... 280/728.3 |

\* cited by examiner

*Primary Examiner* — Faye M. Fleming
(74) *Attorney, Agent, or Firm* — Reising Ethington P.C.

(57) ABSTRACT

A vehicle interior panel for use over an airbag includes a decorative covering with a grain-coordinated tear seam. The decorative covering includes a visible surface with a grain pattern formed therein, and individual stress risers of the tear seam a located at valleys of the grain pattern. Holes cut through a skin layer of the decorative covering in this manner have reduced visibility, due in part to light reflection characteristics at the grained surface that tend to form shadowed areas in the grain valleys. A method for forming a grain-coordinated tear seam includes determining the location of peaks and/or valleys of the grain pattern and forming a majority of the stress risers at determined valley locations.

15 Claims, 3 Drawing Sheets

US 8,573,632 B1

GRAIN-COORDINATED AIRBAG TEAR SEAM

TECHNICAL FIELD

The present disclosure relates generally to vehicle interior panels for use over airbags and, more particularly, to tear seams formed in such vehicle interior panels.

BACKGROUND

Vehicle airbags are safety devices that deploy toward the interior of a vehicle to help protect its occupants from injury in the event of a crash. Airbags may be concealed behind or beneath an interior panel during normal vehicle operation until such an event. When the airbag deploys, it typically does so through a deployment opening formed in or around the interior panel. The deployment opening may be pre-formed in the panel, the panel may move away to reveal the opening, or the opening may be formed during airbag deployment at a pre-determined location in the panel. Where formed during deployment, a tear seam may be provided in one or more components of the panel to control the location of material separation during airbag deployment. The tear seam usually consists of one or more stress concentrators formed in a layer of material along the desired tearing location. Notches, grooves, and other types of cuts in the material are examples of stress concentrators. Non-visible tear seams are sometimes desired and often constructed with the tear seam formed from the non-visible side of the material so that the stress concentrators are not apparent to the naked eye.

French Patent 2 875 562 to Godefroy describes a method of forming an airbag tear seam in a vehicle interior covering by perforating the covering from the visible side with a multi-needle piercing device. The device includes spring-loaded and retractable needles that extend from a housing and purports to allow the use of small needles that can help reduce the visibility of the holes produced by the needles. But the device's ability to produce a non-visible tear seam is questionable due to the large number of needles pressing simultaneously on the exterior of the covering, thus requiring a large load for penetration that can deform the surrounding area of the tear seam.

SUMMARY

In accordance with one embodiment, a method of forming a tear seam in a decorative covering for use over an airbag includes the steps of: (a) providing a decorative covering having a grain pattern formed in a surface of the covering, the grain pattern having a topography comprising a plurality of peaks and valleys; (b) determining the location of at least some of the peaks or valleys or both; and (c) forming a plurality of stress risers in the decorative covering along a desired tear seam location, wherein a majority of the stress risers are formed at valley locations determined in step (b).

In at least one embodiment, substantially all of the stress risers formed in step (c) are formed at valley locations determined in step (b).

In at least one embodiment, the respective time periods of steps (b) and (c) at least partially overlap so that at least some of the locations determined in step (b) are determined after some of the stress risers are already formed.

In at least one embodiment, step (b) is completed before step (c).

In at least one embodiment, step (c) comprises laser cutting holes at least partially through the decorative covering.

In at least one embodiment, step (c) comprises mechanically cutting holes at least partially through the covering.

In at least one embodiment, step (c) includes forming the stress risers from the grain pattern side of the covering.

In at least one embodiment, no more than three adjacently formed stress risers lie along a straight line.

In at least one embodiment, each of the stress risers is formed at a location where the topography falls below a threshold value.

In at least one embodiment, the decorative covering is provided as part of a vehicle interior panel comprising an underlying substrate.

In accordance with another embodiment, a vehicle interior panel for use over an airbag includes a substrate configured to have a deployment opening formed through the substrate at a pre-determined location during airbag deployment and a decorative covering disposed over the substrate. The decorative covering has a grain pattern comprising a plurality of peaks and valleys formed in a visible outer surface of the covering. The panel also includes a tear seam comprising a plurality of stress risers formed in the decorative covering, and a majority of the stress risers are located at valleys of the grain pattern.

In at least one embodiment, the decorative covering comprises a decorative skin layer having the grain pattern formed therein, and the stress risers comprise holes that extend completely through the skin layer.

In at least one embodiment, the distance between adjacent stress risers is non-uniform.

In at least one embodiment, the stress risers generally are not located along a smooth line.

In at least one embodiment, the vehicle interior panel is an instrument panel.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF ILLUSTRATIVE EMBODIMENT(S)

As will become apparent from the following disclosure, a vehicle interior panel for use over an airbag may be constructed with a grain-coordinated tear seam having reduced visibility, even where stress risers such as holes are formed completely through the decorative covering. Such a tear seam may be formed by determining the location of peaks and/or valleys of a grain pattern formed in the visible surface of the decorative covering and forming a majority of the stress risers at the determined locations. Preferably, substantially all of the stress risers are located at valleys of the grain pattern. Stress risers formed at these sometimes irregular locations may take advantage of certain light reflection characteristics at the grained surface, where shadows may be present in the valleys of the grain pattern and may help camouflage the stress risers.

Figure 1:
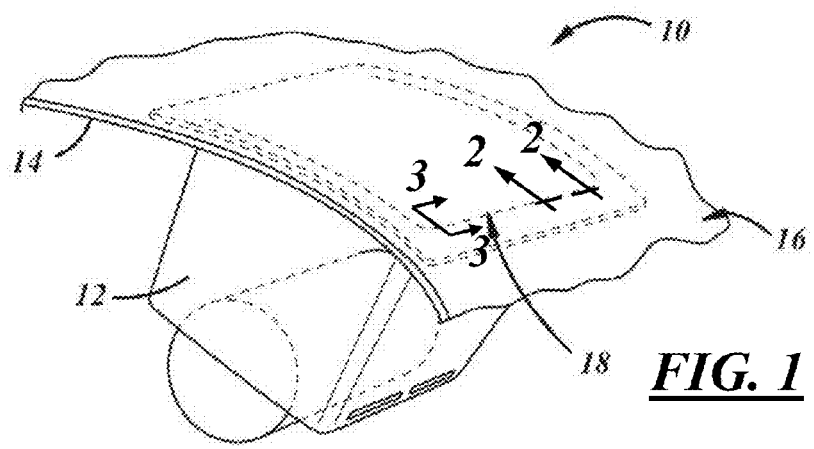
FIG. 1 is partial cutaway view of an instrument panel with an airbag module installed therebeneath and a tear seam formed in the panel, according to one embodiment.

Referring now to FIG. 1, there is shown a cut-away view of one embodiment of a vehicle interior panel 10 with an airbag module 12 installed therebeneath. The portion of the panel 10 shown in the figure is the passenger side of a vehicle instrument panel, but these teachings are applicable to any vehicle interior panel for use over an airbag, such as steering wheel panel, seat panels, door panels, etc. The illustrated panel 10 includes a substrate 14, a decorative covering 16, and a tear seam 18 formed in the covering. The substrate 14 is configured to have a deployment opening formed therethrough a pre-determined location during airbag deployment. For example, in the panel 10 of FIG. 1, the substrate 14 may have a score line, notch, groove, or other stress concentrator(s) formed therein that causes the substrate to break along the stress concentrator(s) to form an airbag door when the underlying airbag deploys. Alternatively, the substrate 14 may have a molded-in airbag door, an airbag door attached via a hinge or tether, or an opening through which an underlying airbag door opens during airbag deployment. The opening revealed by the airbag door is the deployment opening.

The substrate 14 and covering 16 may be made using known materials and techniques. For example, the substrate 14 may be constructed from an injection-molded thermoplastic material, such as glass-filled polypropylene, or any other material or combination of materials that helps define the overall shape of the panel 10 and supports the decorative covering 16. The covering 16 may provide a desired aesthetic to the vehicle interior and may include any number of material layers, such as a decorative skin layer (e.g., leather or a textured polymeric film), a foam cushioning layer, a spacer fabric layer and/or other layers. The covering 16 may include multiple layers laminated together and disposed over and/or attached to the substrate 14 or it may include one or more separately formed layers. In one embodiment, the covering is a bilayer material including a polymeric foam layer laminated with a polymeric skin layer having a grained or textured visible surface.

Figure 2:
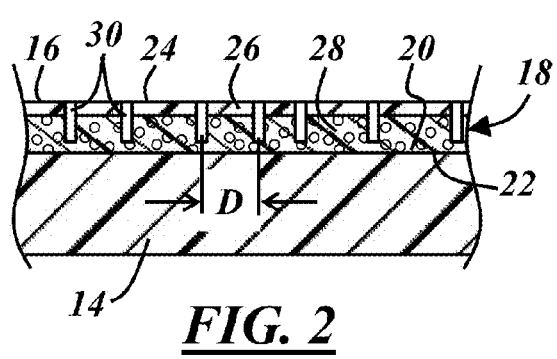
FIG. 2 is a partial cross-sectional view of the panel of FIG. 1, showing an illustrative tear seam comprising a plurality of stress risers.
Figure 3:
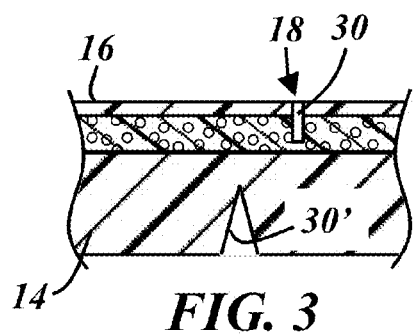
FIG. 3 is another partial cross-sectional view of the panel of FIG. 1.

FIGS. 2 and 3 are partial cross-sectional views of the panel of FIG. 1 illustrating one example of a tear seam 18 that can be formed by the method described herein. The substrate 14 has an outer surface 20 that faces toward the vehicle cabin with the decorative covering 16 disposed over the outer surface. The decorative covering 16 has an inner surface 22 facing the substrate outer surface 20 and an opposite outer surface 24, which is the visible surface in this example. In this embodiment, the covering 16 includes a decorative skin layer 26 that provides the visible surface 24, and a foam inner layer 28 between the substrate 14 and the skin layer. The tear seam 18 includes a plurality of stress risers 30 formed in and along the covering 16. In this example, the stress risers 30 are holes formed completely through the skin layer 26 and partially through the inner layer 28. Other types of stress risers 30 include slits, cuts or notches, for example. The stress risers 30 may be formed from either side of the covering 16 and/or only partially through one material layer or completely through all of the material layers.

As shown in FIG. 2, for tear seams comprising a plurality of stress risers 30, adjacent stress risers are spaced from one another along the tear seam 18 a distance D. As described in greater detail below, the distance D between adjacent stress risers 30 may unconventionally be non-uniform (i.e., not constant), as is apparent in FIG. 2. That is, rather than indexing a stress riser forming tool the same amount along the desired tear seam path after each stress riser is formed, the location of each individual stress riser may be based on other factors. FIG. 3 also illustrates a substrate stress riser 30' in the form of a notch along which an airbag door edge is formed during airbag deployment. At least a portion of the tear seam 18 may be located along the notch 30' or other portion of the substrate that corresponds to the airbag door formed during deployment.

Figure 4:
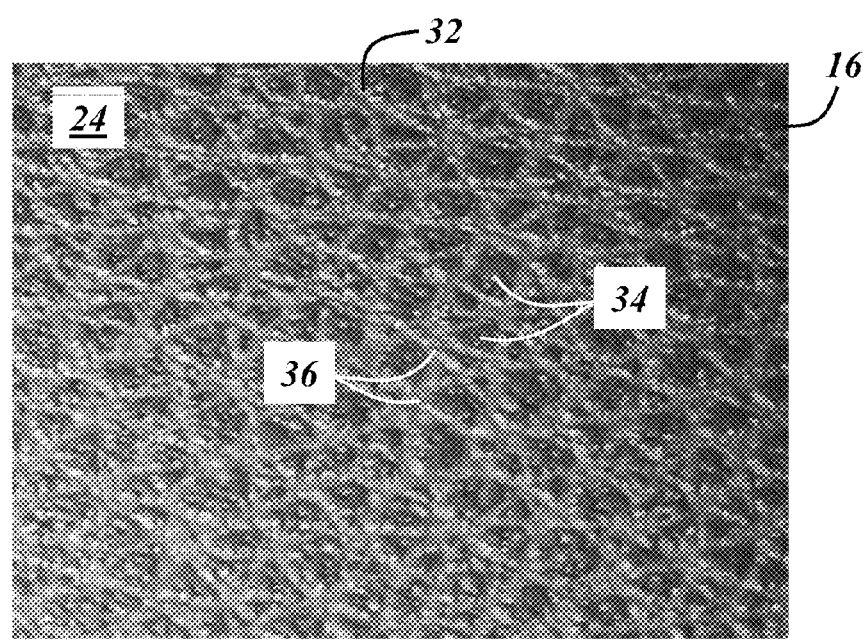
FIG. 4 is an enlarged photographic image of the visible side of a decorative covering having a grain pattern formed in the outer surface.

FIG. 4 is a magnified photographic image of an exemplary decorative covering 16 that has a grain pattern 32 formed in the visible outer surface 24. The grain pattern 32 has a three-dimensional topography intended to provide an appealing aesthetic to the covering 16 and the panel of which it is a part. The topography includes a plurality of peaks 34 and valleys 36. In the image of FIG. 4, the peaks 34 are located in the darker, granule-shaped areas, and the valleys 36 are located in the lighter web of relatively narrow areas that wind between the peaks. The grain patterns 32 contemplated here are intentionally provided for aesthetic reasons, such as to simulate natural materials or to alter the gloss level of the visible surface. The size scale of such grain patterns is on the millimeter scale in the plane of the outer surface 24 and on the micron scale in the thickness direction. For example, the granule-shaped areas of the grain pattern 32 of FIG. 4 may have an average size in a range from 0.5 mm to 2.0 mm in the plane of the outer surface 24 and an average peak-to-valley depth in a range from 25 μm to 400 μm, depending on the particular application. The grain pattern 32 may be generally random, like that of FIG. 4, or it may be a uniform pattern.

Figure 5:
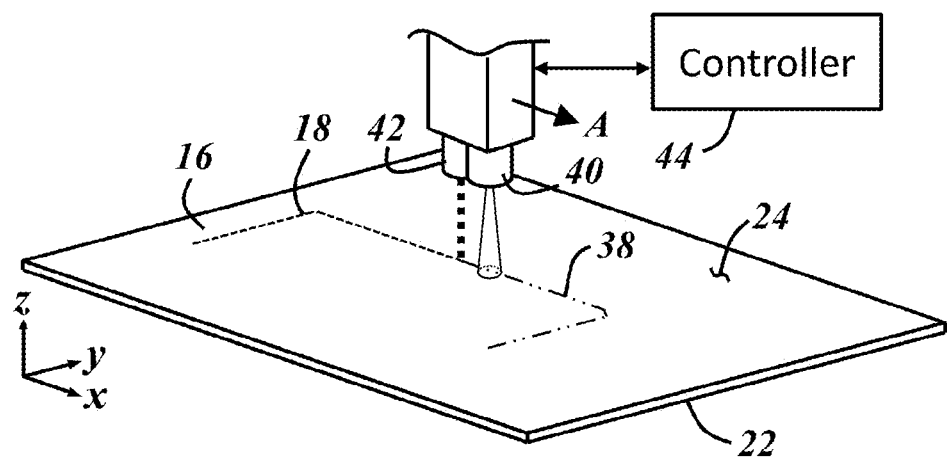
FIG. 5 is a schematic representation of one embodiment of a method of forming a grain-coordinated tear seam in a decorative covering.

Turning now to FIG. 5, one example of a method of forming a grain-coordinated tear seam 18 is illustrated schematically. The method may include the steps of providing a decorative covering 16 having a grain pattern (not shown in FIG. 5) formed in a surface 24 thereof, determining the location of at least some of the peaks and/or valleys of the grain pattern topography, and forming a plurality of stress risers in the decorative covering along a desired tear seam location 38 so that a majority of the stress risers are formed at determined valley locations. Preferably, substantially all of the stress risers of a grain-coordinated tear seam are located at valleys for which the locations have been determined. However, skilled artisans may reap the benefits of the grain-coordinated tear seam described herein with significantly less than all of the stress risers being so located. In the illustrated example, a topography scanner 40, a cutting tool 42, and a controller 44 are combined to perform the method. The desired tear seam location 38 is shown in phantom, and the portion of the tear seam 18 already formed is shown as a dotted line. The illustrated controller 44 or some other controller may provide motion control to the scanner 40 and/or cutting tool 42 to move one or both of them along the desired tear seam location.

In the example of FIG. 5, the scanner 40 and cutting tool 42 are shown moving together in the direction of the arrow A (the x-direction in this case) so that the cutting tool follows behind the scanner in what may be referred to as "live grain mapping," in which the stress risers are formed in real-time as the scanner collects information about the grain pattern topography. In other words, the respective time periods of the method step of determining peak and/or valley locations and the method step of forming the stress risers at least partially overlap so that at least some of the peak and/or valley locations are being determined after some of the stress risers have already been formed. The scanner 40 is configured to determine, or at least gather information to determine, the location of the peaks and/or valleys of the grain pattern. The controller 44 receives information from the scanner 40 and activates the cutting tool 42 to form stress risers at at least some of the just-determined locations. In other embodiments, formation of the stress risers is not necessarily in real-time with the collection of topography information by the scanner 40. For example, the scanner 40 may move along the desired tear seam location 38 to collect topography information, and send the collected information to the controller or elsewhere for storage and/or for processing. Then, after the controller or some other processor determines the desired locations for the stress risers, the cutting tool 42 may move along the desired tear seam location 38 to form the plurality of stress risers accordingly.

In the illustrated example, the cutting tool 42 is a laser that forms holes at least partially through the covering 16 from the visible side 24 of the covering. In other embodiments, the cutting tool 42 may be a mechanical cutter, such as a piercing tool or needle, a slitting knife tip, or a microdrill. Also, the cutting tool 42 may be arranged to form the stress risers from the opposite side 22 of the covering 16, such as in embodiments where the tear seam is formed in the covering prior to the covering being disposed over the panel substrate. The method can be performed on the covering 16 either before or after it is disposed over the panel substrate, or partially before and partially after.

The scanner 40 can be any of a variety of devices capable of discerning the valley locations in the grain topography. Some examples include a laser scanner, an electron microscope scanner, and an optical imager, to name a few. For example, a laser or electron microscope scanner may collect z-direction grain dimensional information—with respect to a known z-reference point—along the desired tear seam location 38 and provide the information to the controller 44, which can use the information to determine peak and/or valley locations. An optical imager may collect optical information, such as imagery of the dark and light areas of the grain pattern of FIG. 4, for example, and provide the imagery or information about the imagery to the controller 44. Mechanical scanners such as surface roughness gages are contemplated as well.

Figure 6:
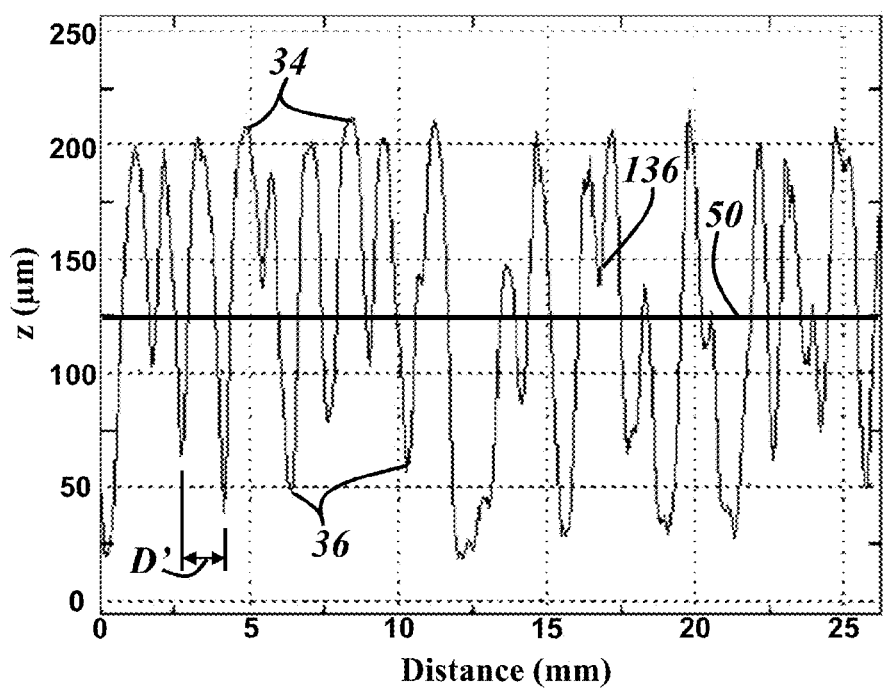
FIG. 6 is a chart showing the topography of a grain pattern formed in the outer surface of a covering.

FIG. 6 is a plot of the topography of an exemplary grain pattern formed in the outer surface of a decorative covering. The information used to generate the plot in FIG. 6 was obtained from an electron microscope scanner along a straight line representing a possible tear seam location. In other words, the scanner was translated relative to the covering, and z-direction topography measurements were taken at a resolution and speed sufficient to make the peaks 34 and valleys 36 discernible. The controller or other processor may be capable of identifying locations along the desired tear seam location that correspond to the valley 36 locations and causing the cutting tool to form stress risers at at least some of those locations. A stress riser need not be formed at every valley 36, however. For example, in FIG. 6, while the distance D' between adjacent valleys 36 is non-uniform, it is in a range from about 1.5 mm to about 2 mm on average. In some cases, the desired average distance between adjacent stress risers may be higher than the average distance D', such as about 3 mm in the illustrated example, to further reduce tear seam visibility. Thus the controller may opt to skip at least some of the determined valley locations and not form a stress riser at those locations. However, the method described here may facilitate smaller stress riser spacing due to the above-mentioned camouflage effect of the grain pattern valleys and the tendency for grain-coordinated stress risers to be less visible.

Also shown in FIG. 6 is a threshold value 50 for the topography. In this case, the threshold value 50 is a dimension in the z-direction and is about midway between the dimensions for the peaks 34 and the valleys 36. The threshold value 50 of may vary among different grain patterns. The threshold value may be useful as a set-point for the above-described controller. For example, the controller may identify a block of data below the threshold value 50 as a valley and decide whether to form a stress riser at that location. Or, in cases where a system processor indentifies peaks and valleys in some other manner (e.g., curve shape analysis), the threshold value 50 may help identify false valleys, such as the false valley 136 shown in FIG. 6.

Figure 7:
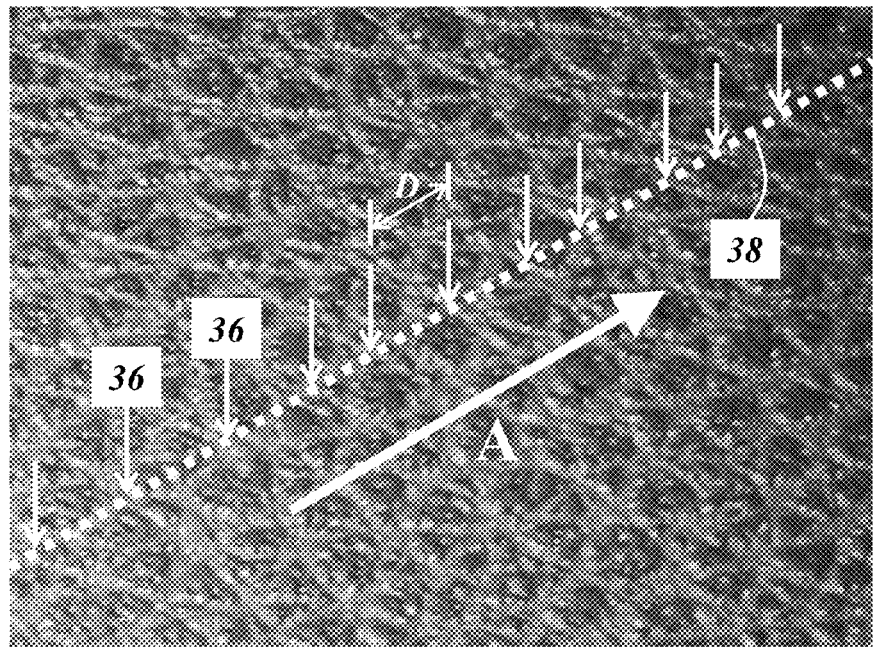
FIG. 7 is the photographic image of FIG. 4, showing exemplary stress riser locations at valleys of the grain pattern and along a desired tear seam path.
Figure 8:
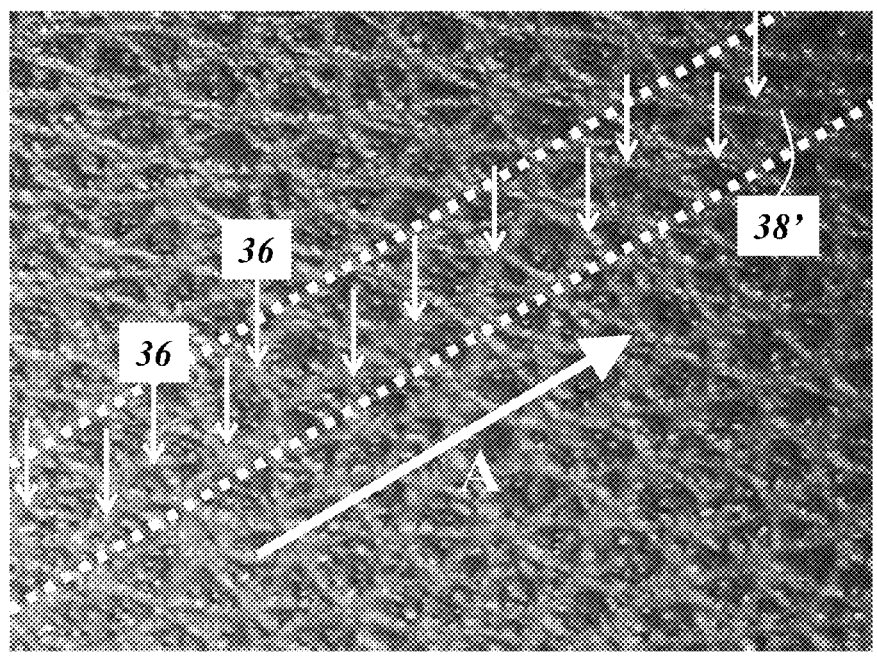
FIG. 8 is the photographic image of FIG. 4, showing exemplary stress riser locations at valleys of the grain pattern and along a widened tear seam path.

FIG. 7 is a depiction of a plurality of valley 36 locations that may be identified using the above-described method of making a grain-coordinated tear seam comprising stress risers formed along an exemplary tear seam location 38. The tear seam location 38 is shown along the grain pattern shown previously in FIG. 4. Due partly to the generally random nature of the grain pattern, the distance D between adjacent valley locations 36 is non-uniform. Arrow A depicts an exemplary direction of topography determination and stress riser In another embodiment, depicted in FIG. 8 with the same grain pattern shown in FIG. 7, the valley 36 locations identified for stress riser formation do not lie along a straight line or other smooth contour. In this instance, the desired tear seam location is provided along a path 38' having a discernible width rather than a narrow line. The above-described scanner may be configured to collect topography information along such a discernible width. This type of information may allow the controller and/or some other processor to determine the locations of the deepest valleys along the wider tear seam location and cause the cutting tool to form stress risers at the deepest valleys, resulting in a plurality of stress risers that are generally unaligned along the formed tear seam. For example, it is possible that no more than two or three adjacently formed stress risers lie along a straight line. It is also contemplated that an entire sheet of covering material, or continuous roll stock covering material, could be fed through a topography scanner capable of mapping the topography of the entire covering relative to some datum point and sending the information to a controller, processor, or storage device for later user in forming a grain-coordinated tear seam.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above.

Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of forming a tear seam in a decorative covering for use over an airbag, comprising the steps of:
   (a) providing a decorative covering having a grain pattern formed in a surface of the covering, the grain pattern having a topography comprising a plurality of peaks and valleys;
   (b) determining the location of at least some of the peaks or valleys or both; and
   (c) forming a plurality of stress risers in the decorative covering along a desired tear seam location, wherein a majority of the stress risers are formed at valley locations determined in step (b).

2. The method of claim 1, wherein substantially all of the stress risers formed in step (c) are formed at valley locations determined in step (b).

3. The method of claim 1, wherein the respective time periods of steps (b) and (c) at least partially overlap so that at least some of said locations are determined after some of the stress risers are already formed.

4. The method of claim 1, wherein step (b) is completed before step (c).

5. The method of claim 1, wherein step (c) comprises laser cutting holes at least partially through the decorative covering.

6. The method of claim 1, wherein step (c) comprises mechanically cutting holes at least partially through the covering.

7. The method of claim 1, wherein step (c) includes forming the stress risers from the grain pattern side of the covering.

8. The method of claim 1, wherein no more than three adjacently formed stress risers lie along a straight line.

9. The method of claim 1, wherein each of the stress risers is formed at a location where the topography falls below a threshold value.

10. The method of claim 1, wherein the decorative covering is provided as part of a vehicle interior panel comprising an underlying substrate.

11. A vehicle interior panel for use over an airbag, comprising:
    a substrate configured to have a deployment opening formed through the substrate at a pre-determined location during airbag deployment;
    a decorative covering disposed over the substrate, wherein the decorative covering has a grain pattern comprising a plurality of peaks and valleys formed in a visible outer surface of the covering; and
    a tear seam comprising a plurality of stress risers formed in the decorative covering, wherein a majority of the stress risers are located at valleys of the grain pattern.

12. A vehicle interior panel as defined in claim 11, wherein the decorative covering comprises a decorative skin layer having the grain pattern formed therein, and the stress risers comprise holes that extend completely through the skin layer.

13. A vehicle interior panel as defined in claim 11, wherein the distance between adjacent stress risers is non-uniform.

14. A vehicle interior panel as defined in claim 11, wherein the stress risers generally are not located along a smooth line.

15. A vehicle instrument panel according to claim 11.

* * * * *